US005228120A

United States Patent [19]

Farr, deceased et al.

[11] Patent Number: 5,228,120

[45] Date of Patent: Jul. 13, 1993

[54] DISPLAY SYSTEM WITH DIRECT COLOR MODE

[75] Inventors: Robert W. E. Farr, deceased, late of Eastleigh, by Ruth S. Farr, legal representative; David C. Haigh, Winchester, both of England

[73] Assignee: International Business Machines Corporation, Armonk, N.Y.

[21] Appl. No.: 914,230

[22] Filed: Jul. 13, 1992

Related U.S. Application Data

[63] Continuation of Ser. No. 484,142, Feb. 23, 1990, abandoned.

[30] Foreign Application Priority Data

Oct. 12, 1989 [EP] European Pat. Off. ........ 89310456.2

[51] Int. Cl.[5] ........................ G06F 15/40; G04G 1/00

[52] U.S. Cl. .................................... 395/131; 395/162; 395/164; 340/703; 340/799

[58] Field of Search ............... 340/703, 747, 750, 798, 340/799; 395/131, 162, 164

[56] References Cited

U.S. PATENT DOCUMENTS

| | | | |
|---|---|---|---|
| 4,712,099 | 12/1987 | Maeda | 340/703 |
| 4,808,989 | 2/1989 | Tabata et al. | 340/750 |
| 4,857,901 | 8/1989 | Lathrop | 340/703 |
| 4,878,178 | 10/1989 | Takakura et al. | 364/521 |
| 4,894,789 | 1/1990 | Yee | 364/521 |
| 4,905,164 | 2/1990 | Chandler et al. | 364/518 |
| 4,975,861 | 12/1990 | Fugimoto | 364/521 |

*Primary Examiner*—Phu K. Nguyen
*Attorney, Agent, or Firm*—Martin J. McKinley

[57] ABSTRACT

A display system having a display memory, a palette and a digital-to-analogue converter stage is able to support both an indirect color mode and a direct color mode. In the indirect color mode. pixel data from the display memory is used to access chrominance and/or luminance data from the palette for conversion in the converter stage into analogue values for controlling a display device. In the direct color mode. pixel data in the display memory directly specifies the chrominance and/or luminance data for conversion in the converter stage into analogue values for controlling the display device. In the direct color mode, however, the converter stage is also responsive to data from the palette for producing the analogue values for controlling the display device. The invention permits the provision of direct as well as indirect color modes in a flexible and efficient manner, with the provision of a plurality of formats for the direct color modes being achieved by loading appropriate information into the palette.

11 Claims, 6 Drawing Sheets

DISPLAY SYSTEM WITH DIRECT COLOR MODE

This is a continuation of U.S. patent application Ser. No. 07/484,142 filed on Feb. 23, 1990, now abandoned.

TECHNICAL FIELD

The invention relates to a display system operable in both indirect and direct color modes.

BACKGROUND ART

The most common display mode in use today in display systems such as personal computers or display adapters for such computers can be referred to as an "indirect color mode". In this mode of operation pixel data, contained in a display memory, are used indirectly to define the chrominance and/or luminance values of the pixels for display.

In a display system having an all-points addressable (APA) display memory, a number, typically between 1 and 8. of bits is stored for each of the picture elements (or pixels) of a display field (corresponding. for example to the screen of a display device). When operating in an indirect color mode, these bits in the display memory form an index for accessing a location within a look-up table called a palette. The addressable locations in the palette contain display data defining the chrominance and/or luminance for a pixel having an index addressing that palette location. In the case of a display system for controlling a color cathode ray tube, or another display device where colors are generated by mixing the primary colors red, green and blue, the palette entry will contain chrominance and/or luminance data determining an intensity for each of those colors. If the display device requires analogue signals for controlling the physical display processes, the chrominance and/or luminance data output from the palette are then converted into analogue signals in digital-to-analogue converters (DACs) for controlling the display device (eg. in the case of a color CRT. the color guns).

In an indirect color mode it is usual for up to eight bits to be stored for each pixel in a display memory and for these to be translated in a look-up table, or palette into three values which define the intensity of the red, green and blue elements of the pixel. The standard indirect color mode which has been adopted in many existing display adapters, such as those for the IBM PS/2 (trademark of International Business Machines Corp.) computer family, is for the palette to generate 6 bits each for red, green and blue, making 18 bits in all. Where the display memory comprises 8 bit planes (ie. 8 bits per pixel) it allows the simultaneous display of up to 256 (28) different colors, chosen from the 256K (218) possible different colors.

For some applications, however, it is not sufficient to be able only to specify 256 colors simultaneously. In this case, a greater number of bits per pixel are needed. If 16 bits are used. 64K (2**16) different colors can be specified at a time. The possibility of specifying one of 64K different colors makes a palette unnecessary. Also, using 16 bits to address a palette would make it uneconomically large. Accordingly, if the display memory can be arranged to define a sufficiently large number of bits per pixel to enable all the desirable colors to be specified directly, it is possible to operate in a so-called "direct color mode" where the values stored in the display memory control the display device directly via the DACs.

If it is desired to enable a display system to operate in both an indirect mode and a direct mode. a problem arises in that different numbers of bits for controlling the digital-to-analogue converter stage may be generated in the indirect and direct color modes. Consider the case as described above where 18 bits of chrominance and/or luminance data are generated for each pixel in an indirect color mode. In order to accommodate this, the digital-to-analogue converter stage will, in the indirect color mode, have to convert the 18 chrominance and/or luminance data bits from the palette into analogue chrominance and/or luminance values for controlling the display of the pixels. If, however. 16 chrominance and/or luminance data bits (ie. $2\times8$ bits) in the display memory are used in a direct color mode for defining directly the color and/or luminance of the pixels there will be two inputs to the converter stage which will not be specified.

It will be appreciated that the numbers mentioned here are purely illustrative of the general problem of how to provide a display system which is able to operate in both a direct and an indirect color mode, where a different number of bits for defining the chrominance and/or luminance of the pixels in the different modes.

SUMMARY OF THE INVENTION

In accordance with the invention, there is provided a display system operable in both indirect and direct color modes, the display system comprising a display memory, a palette and a digital-to-analogue converter stage and being operable such that, in an indirect color mode, pixel data in the display memory is used to access chrominance and/or luminance data from the palette for conversion in the converter stage into analogue values for controlling a display device and, in a direct color mode, pixel data in the display memory directly specifies the chrominance and/or luminance display data for conversion in the converter stage into analogue values for controlling the display device, the converter stage also being responsive in the direct color mode to data bits from the palette for producing the analogue values for controlling the display device.

The invention permits the provision of direct as well as indirect color modes in a flexible and efficient manner. The provision of a plurality of formats for the direct color modes can be achieved by loading appropriate information into the palette.

Preferably only selected bits from the display memory are supplied as an input to the palette for determining the bits output therefrom to the converter stage. In a case where the display memory contains. in a direct color mode. 16 bits of data per pixel and the converter stage requires 18 input bits, the two remaining bits can be supplied from the palette. Alternatively, in case where the converter stage requires 24 input bits, the 8 remaining bits can be supplied from the palette. It is also possible, however, where the converter comprises a plurality of digital-to-analogue converters, for all the bits for one of the converters to be supplied from the palette. By loading appropriate information in the palette, the data bit on selected address bit lines of the palette can be output from corresponding output lines so that specific bits effectively "pass through" the palette.

Depending on the order of the bits within a direct color word in the display memory, it may be desirable in some implementations to rearrange the order of bits output from the display memory in a direct color mode in response to a mode control signal. This is in order to minimize the number of bits which change their significance between various data formats as will become clear from the specific examples described hereinafter.

BRIEF DESCRIPTION OF THE DRAWING

Particular examples of display systems in accordance with the present invention will be described hereinafter with reference to the accompanying drawings in which.

DESCRIPTION OF THE PREFERRED EMBODIMENTS

Figure 6:
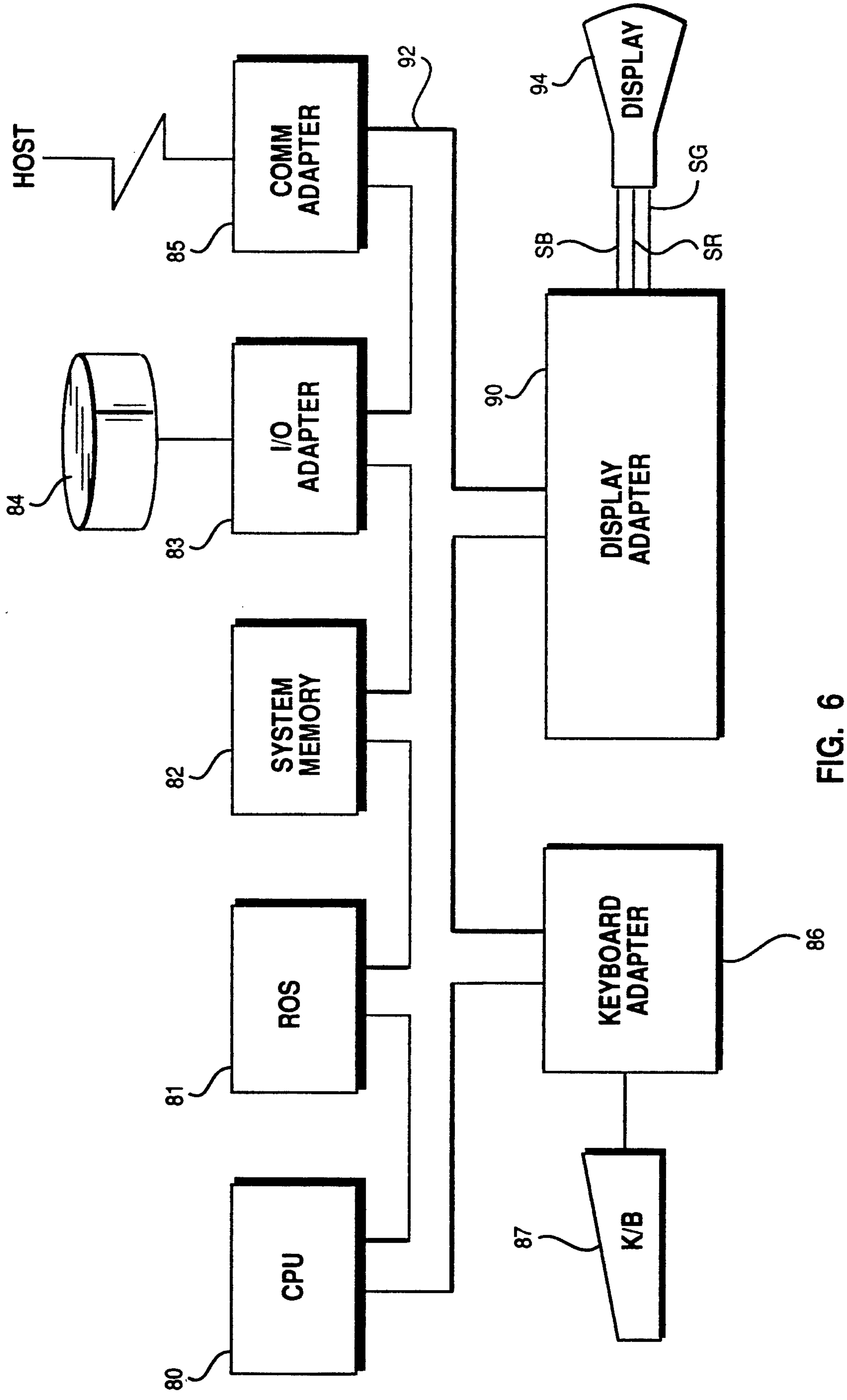
FIG. 6 is a block diagram of a workstation into which the elements of FIGS. 1 or 5 may be incorporated.

Particular examples of display systems in accordance with the invention are described herein in the form of display adapters for incorporation in a workstation such as the workstation shown in FIG. 6. It should be understood however, that the term "display system" as used in the claims is not limited to a display adapter, but is intended to include any system capable of displaying information. Thus for example, a "display system" could be a display adapter supplied as an add-on card to an existing computer such as the workstation shown in FIG. 1, or it could be a complete computer system.

Figure 1:
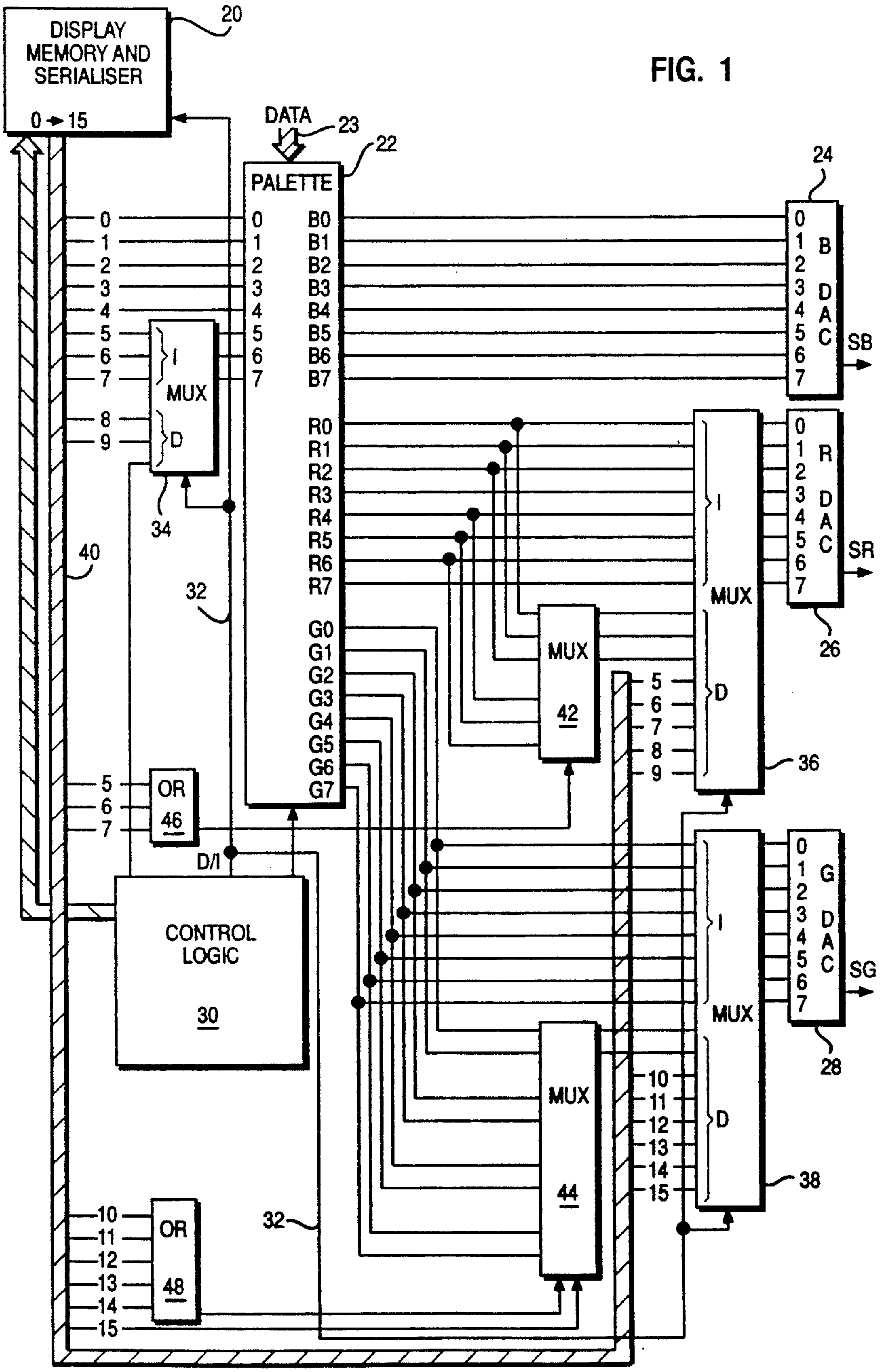
FIG. 1 is a block diagram of elements of a first example of a display system in accordance with the invention.

FIG. 1 is a block diagram of elements of a first example of a display system in accordance with the invention. Illustrated in FIG. 1 are a display memory 20. a color look-up table, or palette, 22, a digital-to-analogue converter stage comprising three digital-to-analogue converters, or DACs. 24. 26. 28. control logic 30 and a plurality of multiplexors and interconnections. For reasons of clarity and ease of explanation, only those features which are specific to an understanding of how to implement the present invention are illustrated in FIG. 1.

The display memory 20 is an all-points addressable display memory with a serialiser such that the memory can be configured to store a plurality of bits for each of the picture elements or, pixels, of the display field for the attached display device (not shown). It is assumed here that the display device is a color cathode ray tube device. The palette 22 has eight address inputs (0–7) giving 256 addressable locations. Each addressable location contains twenty-four bits of color information. The three DACs 24. 26. 28, each receive eight bits of digital input information on inputs 0 to 7 and produce an analogue output signal for controlling the display device. DAC 24 produces a signal. SB. for controlling blue intensity. DAC 26 produces a signal. SR. for controlling red intensity and DAC 28 produces a signal SG. for controlling green intensity.

The display system is capable of operating in either an indirect color mode or a direct color mode under the control of the control logic 30. To set the display system in an indirect color mode, the control logic outputs a signal on the line 32 which causes multiplexors 34. 36 and 38 to select inputs to the multiplexors indicated by the letter "I" and causes the serialiser of the display memory 20 to output eight bits on each access.

Data is read out from the display memory 20 via a 16-bit data bus 40. In an indirect color mode only eight of the data lines on the bus are used, whereas. in the direct color mode all 16 bits on the data bus 40 are used.

Figure 2:
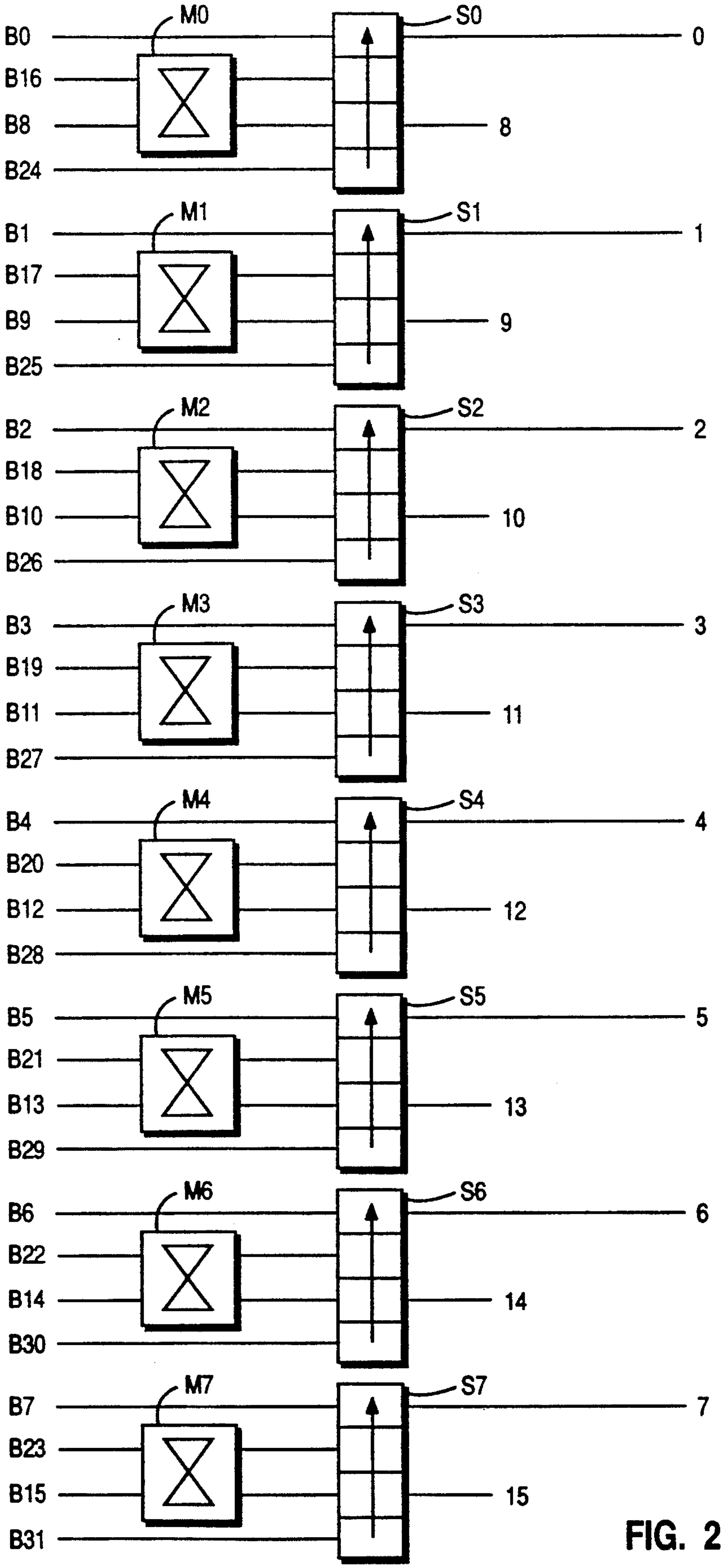
FIG. 2 is a block diagram of serialiser logic for incorporation in the display system of FIG. 1.

FIG. 2 illustrates serialiser logic for incorporation in a 32-bit display memory 20 to form either two consecutive 16 bit pixels (memory bits 0–15 followed by memory bits 16–31) in a direct color mode, or four consecutive 8-bit pixels (memory bits 0–7, then bits 8-15. then bits 16–23. then bits 24–31) in an indirect color mode. The data appears from the memory on lines BO–B31. Selected pairs of bits are either passed straight through the multiplexors MO -M7 in an direct mode, or are exchanged by the multiplexors MO–M7 in an indirect mode. The egg-timer symbol in the multiplexors represents either parallel straight through paths (=) in a direct mode or crossed paths (x) in an indirect mode. The data on the lines to the right of the multiplexors, as seen in the FIG. are then loaded into shift registers SO–S7 from where they are shifted out on the lines 0–15 of the data bus 40. In an indirect mode, only the data lines 0 to 7 are used, whereas, in the direct mode. data lines 0–15 are used. It should be noted that individual lines to the multiplexors MO–M7 and the shift registers SO–S7 for control signals derived from the control line 32 of FIG. 1 are not shown in FIG. 2 for reasons of clarity.

The operation of the display system in an indirect mode will now be explained with reference to FIG. 1. To set the display system in an indirect color mode, the control logic outputs an appropriate signal on the line 32 which causes multiplexors 34. 36 and 38 to select inputs to the multiplexors indicated by the letter "I" and sets the serialiser of FIG. 2 such that eight bits of data per pixel are output from the display memory 20 onto lines 0 to 7 of the data bus 40. Bits 0–4 of each group of eight bits are passed directly to the palette, and bits 5–7 of each group are passed via the multiplexor 34 to the palette for indexing specific palette locations. Each palette location indexed in turn yields twenty-four bits defining chrominance and/or luminance data for the pixel in question in the form of three eight bit intensity values for each of the primary blue, red and green colors. The groups of eight bits are channelled via the paths shown in FIG. 1 either straight to the corresponding DACs in the case of palette output bits BO–B7 or via the multiplexors 36 and 38 in the case of palette output bits RO–R7 and G0–G7 respectively. The reasons for these differences will become clear when the operation of the direct mode is explained.

In the indirect mode, therefore, the data in the display memory forms indexes for each pixel for accessing a specific location in the palette at which data defining the chrominance and/or luminance appropriate for that pixel is stored. As, in this case the display device is a color cathode ray (CRT) device, this chrominance and/or luminance data is converted by the DACs into appropriate signals for controlling the blue red and green guns of the CRT.

As mentioned above, it may not be sufficient for some applications, to be able only to specify 256 colors simultaneously. Accordingly, the display system of FIG. 1 also supports a direct color mode. To set the display system in a direct color mode, the control logic outputs an appropriate signal on the line 32 which causes multiplexors 34. 36 and 38 to select inputs to the multiplexors indicated by the letter "D" and causes the sets the serialiser of FIG. 2 such that sixteen bits of data per pixel are output from the display memory 20 onto lines 0 to 15 of the data bus 40. In a direct mode, the sixteen bits of data per pixel in the display memory define directly the chrominance and/or luminance values for the pixel and are intended, in principle, to be supplied directly to the DACs. However, it will be noted that sixteen bits cannot simply be used to define the state of all twenty-four inputs to the three eight-bit DACs 24. 26. 28.

First of all there is the question of how to distribute the available sixteen bits between the three primary colors with no more than eight bits being allocated to any one color DAC. Two formats for doing this are described below. The first is to allocate 6 bits to green, 5 to red and 5 to blue; this will be referred to as the 6-5-5 format. The second is to allocate 6 bits to green, 6 to red and 4 to blue, which will be referred to as the 6-6-4 format. These allocations derive from the fact that the eye can perceive finer changes in green intensity than red, and finer changes in red intensity than blue; therefore fewer bits need to be allocated to blue than to red, and fewer bits need to be allocated to red than to green.

However there remains the problem of what to do with the unused input(s) of an eight-bit DAC when only 4 or 5 or 6 bits are available to drive it. The unused bits could be left permanently off. Alternatively. they could be wired to some of the other bits. or they could be turned on when any of the other bits are turned on. These approaches have their advantages and disadvantages, and each might be desirable in certain circumstances. However, to adopt a single approach would be inflexible. A display system in accordance with the invention does not suffer from the disadvantages of a fixed approach in that the palette is utilised in order to supply the missing bits. By loading appropriate information into the palette and then employing at least some of the data bits from the display memory to address the palette the additional bits can be provided in a very flexible manner.

Table 1 illustrates an allocation of the green, red and blue bits in a 16 bit word for each of two formats for a direct color mode. Table 1 is to be found at the end of this description and relates to the example of a display system in accordance with the invention illustrated in FIG. 1. The two formats relate to the significance of the bits within the 16 bit words. Each 16 bit data word specifies the color and/or chrominance of a pixel and is supplied from the display memory in either a 6-6-4 format or a 6-5-5 format. Remembering that eight bits need to be input to each of the blue, red and green DACs this means that for the 6-6-4 format 2 extra green bits 2 extra red bits, and 4 extra blue bits must be generated. Similarly, for the 6-5-5 format, 2 extra green bits, 3 extra red bits and 3 extra blue bits must be generated.

It will be noted from Table 1, that for the allocation of bits indicated, only bits 4 through 0 of the 16 bit word change their significance between the two formats. These bits 4 through 0 of the 16 bit word are passed to directly to inputs 4-0, respectively, of the palette 32 for forming part of the address thereto. The remaining palette address inputs are supplied via the multiplexer 34.

The data which need to be stored in the palette in order to generate the missing bits depends on the effect it is desired to achieve. The data are stored in the palette via the data bus 23. It is instructive at this point to explain in more detail the philosophy of the expansion for generating the missing bits.

The simplest thing to do with the missing bits would be to hold them at a constant value. However. if this value is non-zero, the DAC will not be able to produce a zero output and it will be impossible to make the screen truly black. Having said this, with some monitors a level may be obtained which is in practice indistinguishable from black so that, in such cases. a constant non-zero value for the missing bits may be acceptable. Alternatively if the value is zero, the DAC will not be able to reach full scale output, so maximum intensity will not be achievable. Making the extra bits always zero does mean that it is possible to make all three DACs give the same output as their inputs are swept through all the steps available to the DAC with the smallest number of bits allocated to it. For example, data in 6-5-5 format would be effectively turned into 5-5-5 format by having the low order green data bit always zero, and hence the three low order bits of all three DACs will be always zero and they can then stay in step. An advantage of this is that the grey tones will then be monochromatic. With other ways of handling the missing bits the DACs will not stay exactly in step so grey tones will be slightly tinted. Another advantage is that all the steps in the output of a DAC will be equal in size. Having the missing bits always set to 1 means both that full scale output can be achieved 1 means both that full scale output can be achieved and that the grey tones will be monochromatic.

If it is necessary for the DACs to be able to achieve both zero and full scale output, the extra DAC bits must be turned on for some values of DAC inputs other than zero. In this case some steps in DAC output will be larger than most of the other steps. A good candidate for an extra large step is the one from the value zero to the lowest non-zero value, because this step is already a very large one in terms of percentage increase in intensity and because a larger step here will introduce some compensation for the gamma exponent characteristic of the CRT.

In practice therefore there are three plausible ways to generate the data for the extra bits.

1. The extra bits are always a constant.
2. The extra bits are turned on progressively as the value of the other bits increases.
3. The extra bits are all turned on when any of the other bits is on.

If the extra bits are stored in the palette, a constant value for them is easy to provide, as no directly color data bits influence this value.

To turn the extra bits on progressively, a reasonable approximation is effectively to connect the extra bits to the most significant direct color data bits of the same color, in the same order of significance. This gives a very close approximation to spreading the extra steps as evenly as possible between zero and full-scale DAC output. The green extra bits would be connected to direct color data bits 15:14. and the red extra bits would be connected to direct color data bits 9:7 in 6-5-5 format and to bits 9:8 in 6-6-4 format.

To turn the extra bits on when any of the other bits is on, the OR of direct color data bits 15:10 is needed for the extra green bits. However, since bits 15:14 are already needed to influence the generation of the extra green bits, the OR of bits 13:10 only is needed. Similarly, because direct color data bits 9:7 are already needed to influence the generation of the missing red bits and because direct color data bit 4 is already needed by the extra bit generation circuitry for the blue bits, the OR of bits 6:5 only is needed.

Hence ideally the following direct color data bits are needed by the extra bit generation logic: 15, 14, OR of 13:10, 9, 8, 7, OR of 6:5, 4, 3, 2, 1, 0. This is a total of 12 bits. Seven of these can be used to address the palette. The 3 missing red DAC bits can be driven from the red palette output bits 2:0 or 6:4 via a two-to-one multiplexor, another of the 12 bits being used to control this multiplexor. The 2 missing green DAC bits can be driven from the green palette output bits 1:0 or 3:2 or 5:4 or 7:6 via a four-to-one multiplexor, two more of the 12 bits being used to control this multiplexor. In this way it is possible to find a use for only 10 of the 12 bits, and therefore some compromise must be made in the choices available in order to reduce the number of bits used by the extra bit generation logic from 12 to 10.

The recommended compromise is to change what is provided to allow the extra bits to be turned on progressively. Instead of being connected to a more significant bit, the least significant extra bit will be turned on when any of the other bits is on. This is very small distortion of the chosen approximation. and a small amount of CRT gamma correction has been incorporated instead. With this compromise the following direct color data bits are needed by the extra bit generation logic: 15, OR of 14:10, 9, 8, 0R of 7:5, 4, 3, 2, 1, 0. This is the desired total of 10 bits. FIG. 1 shows an arrangement for generating the extra bits in this way by means of the OR gates 46, 48, the palette 22. the multiplexors 42 and 44, the D inputs to the multiplexors 34, 36 and 38 and the various interconnecting lines.

The following equations define how to generate the data to be loaded into the palette to cater for each of the three approximation methods in each of the two formats. Note that the data for the green section is independent of the address, but the data for the other sections does depend on the address of the location being loaded. In the following, 'hg' are the two constant green bits, 'sr' are the two constant red bits. 'edcb' are the four constant blue bits, and 'tsr' are the three constant red bits.

For data format 6-6-4:

For constant missing bits:

GREEN(7:0)='hghghghg'b
RED(6)=ADDRESS(4)
RED(5:4)='sr'b
RED(2)=ADDRESS(4)
RED(1:0)='sr'b
BLUE (7:4)=ADDRESS(3:0)
BLUE(3:0)='edcb'b For even spread approximation GREEN(7:0)='11110100'b
RED(6)=ADDRESS(4)
RED(5)=ADDRESS(6)
RED(4)='1'b
RED(2)=ADDRESS(4)
RED(1)=ADDRESS(6)
RED(0)=OR of ADDRESS(6:4)
BLUE(7:4)=ADDRESS(3:0)
BLUE(3:1)=ADDRESS(3:1)
BLUE(0)=OR of ADDRESS(3:0)

For gamma correction approximation:

GREEN(7:0)='11111100'b
RED(6)=ADDRESS(4)
(5:4)='11'b
RED(2)=ADDRESS(4)
RED(1)=OR of ADDRESS(6:4)
RED(0)=OR of ADDRESS(6:4)
BLUE(7:4)=ADDRESS(3:0)
BLUE(3)=OR of ADDRESS(3:0)
BLUE(2)=OR of ADDRESS(3:0)
BLUE(1)=OR of ADDRESS(3:0)
BLUE(0)=OR of ADDRESS(3:0)

For data format 6-5-5:

For constant missing bits:

GREEN(7:0)='hghghghg'b
RED(6:4)='tsr'b
RED(2:0) 'tsr'b
BLUE(7:3)=ADDRESS(4:0)
BLUE(2:0)='dcb'b For even spread approximation:

GREEN(7:0)='11110100'b
RED(6)=ADDRESS(6)
RED(5)=ADDRESS(5)
RED(4)='1'b
RED(2)=ADDRESS(6)
RED(1)=ADDRESS(5)
RED(0)=OR of ADDRESS(6:5)
BLUE(7:3)=ADDRESS(4:0)
BLUE(2:1)=ADDRESS(4:3)
BLUE(0)=OR of ADDRESS(4:0)

For gamma correction approximation:

GREEN(7:0)='11111100'b
RED(6:4)='111'b
RED(2)=OR of ADDRESS(6:4)
RED(1)=OR of ADDRESS(6:4)
RED(0)=OR of ADDRESS(6:4)
BLUE(7:3)=ADDRESS(4:0)
BLUE(3)=OR of ADDRESS(4:0)
BLUE(2)=OR of ADDRESS(4:0)
BLUE(1)=OR of ADDRESS(4:0)
BLUE(0)=OR of ADDRESS(4:0)

Table 1 assumes that the colors are stored in the order Green. Red, Blue (GRB). If the data were stored in the display memory 20 in the order RGB rather than the order GRB of Table 1, many more than bits 4-0 bits would have variable significance because all the G bits would change position. However. if the colors are to be allocated in the order RGB. then a mode control bit can be used to indicate whether the data is in 5-6-5 or 6-6-4 format. In accordance with the value of this control bit, it is possible to modify the order of the direct color data output from the display memory so that the order is as shown in Table 1. Substantially the same display system as illustrated in FIG. 1 could then be used.

Figure 3:
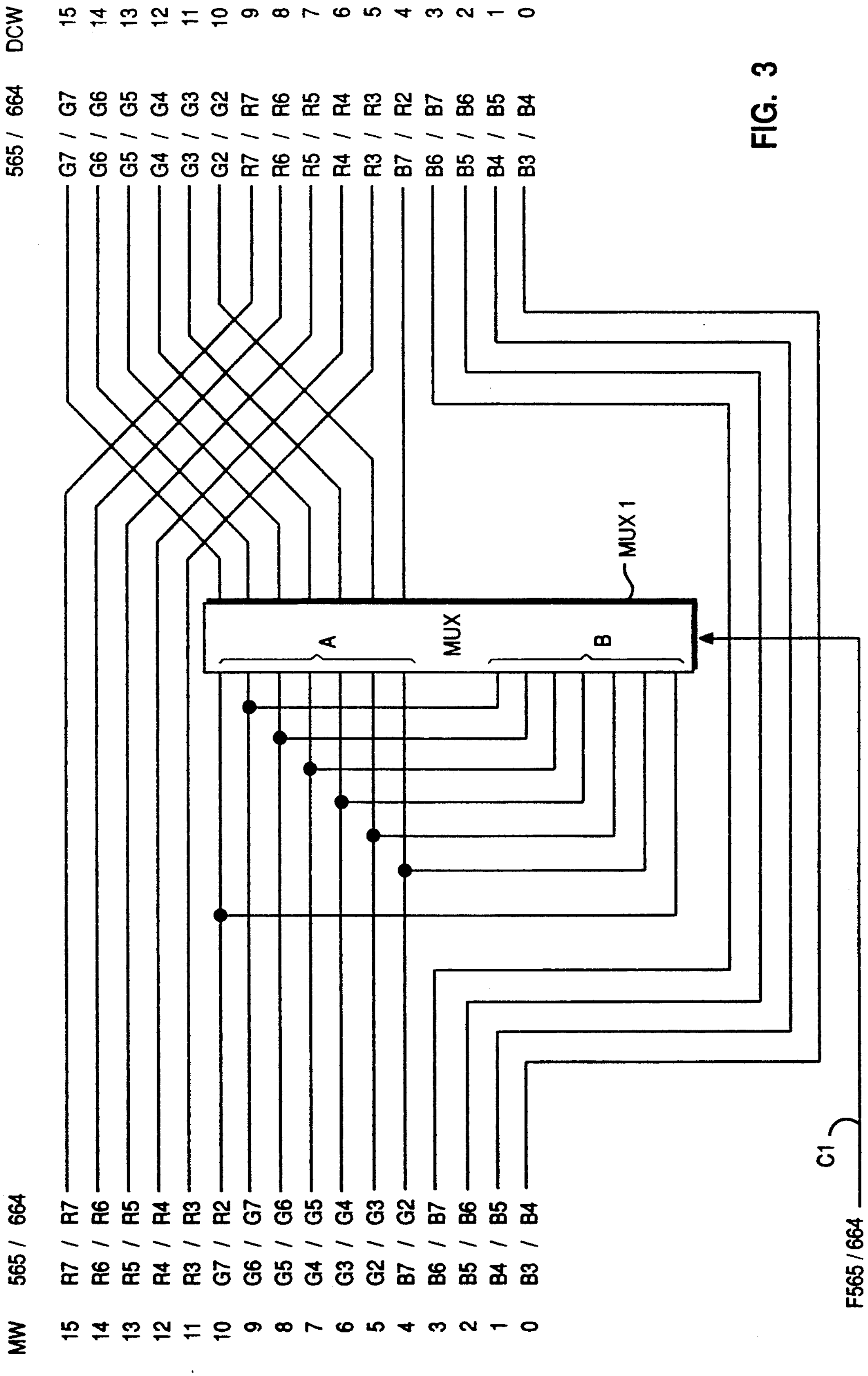
FIG. 3 is a block diagram of a circuit for reformatting of data in the display system of claim 1.

FIG. 3 illustrates a circuit which could be incorporated into the display system of FIG. 1 for modifying the order of the direct color output from the display memory if it is stored in RGB format. This circuit can either be incorporated in the display memory 40 following the serialiser of FIG. 2, or can be inserted in the data bus 40 externally to the display memory. The numbers 0 to 15 in the column headed "MW" at the left of FIG. 3 are the lines 0 to 15 of the data bus 40 as output from the shift registers SO to S7 of the serialiser. The two columns of references to the right of the column headed MW represent the significance of the bits for each of the lines 1 to 15 in the 5-6-5 and the 6-6-4 modes respectively as indicated at the head of those columns. A multiplexor MUXI is connected to certain data lines as shown in FIG. 3. Dependent on the state of a format mode signal indicating either 5-6-5 or 6-6-4 format supplied on a control line Cl from the control logic 30 of FIG. 1. the multiplexer either selects the lines at the first multiplexer port A for a 5-6-5 format or the lines at the second multiplexor port B for a 6-6-4 format. The numbers 0 to 15 in the column headed "DCW" at the right of FIG. 3 are the lines 0 to 15 of the data bus 40 as passed to the further circuit elements of FIG. 1. The two columns of references to the left of the column headed DCW represent the significance of the bits for each of the lines 1 to 15 in the 5-6-5 and the 6-6-4 modes respectively as indicated at the head of those columns. It will be seen that the significance of the data on these last two columns corresponds to the significance for the respective lines illustrated in Table 1.

Figure 4:
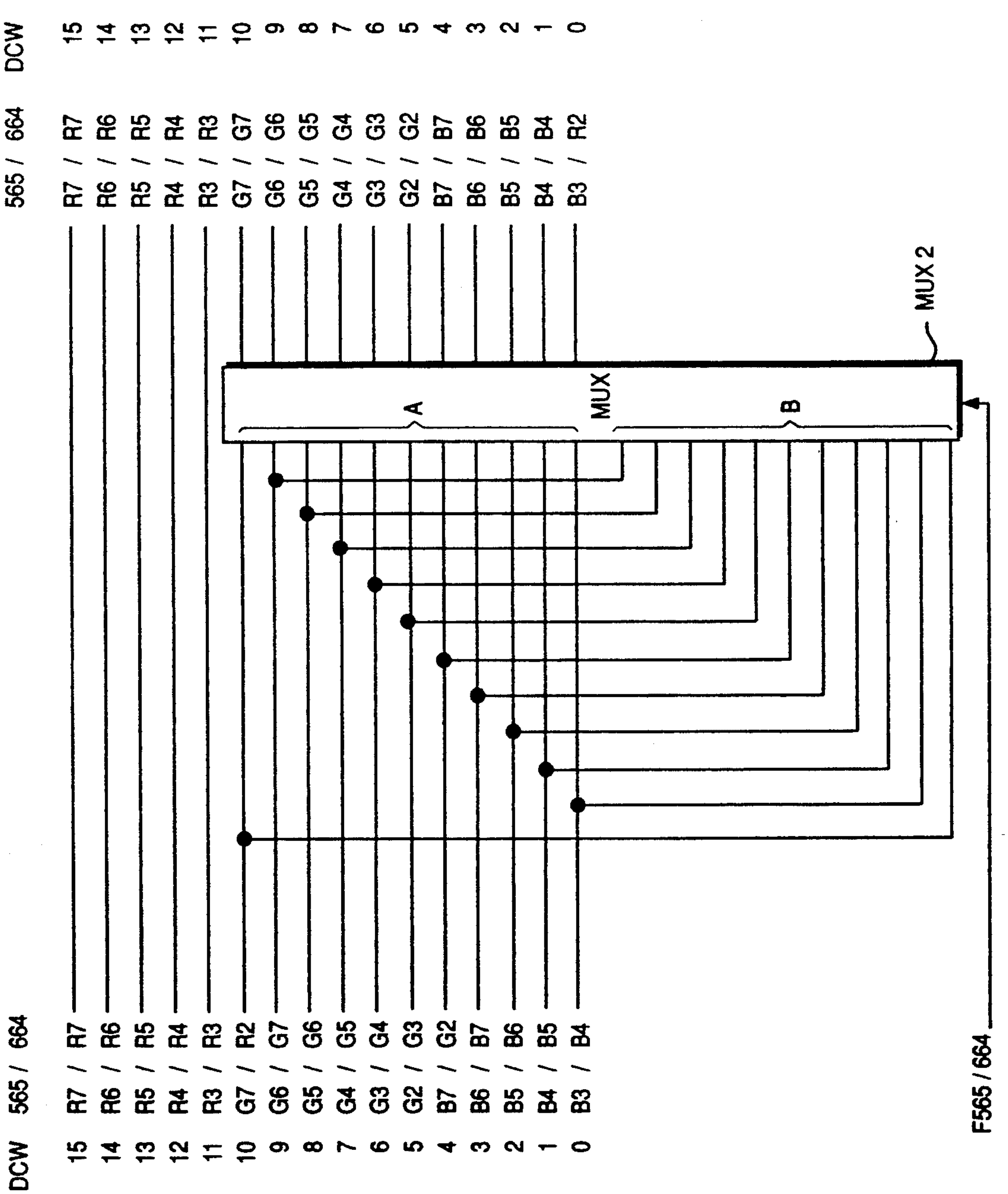
FIG. 4 is a block diagram of a circuit for another reformatting of data.

This approach could be used to further reduce the number of bit which change their significance between formats, although not with the specific embodiment of FIG. 1. which is designed to operate in accordance with Table 1. FIG. 4 illustrates this in the form of a circuit which reorders the data such that only one bit changes its significance between the 5-6-5 and 6-6-4 formats. Table 2 illustrates the data produced by the circuit of FIG. 4 such that it may be compared with Table 1. Table 2 like Table 1 is to be found at the end of this description.

Figure 5:
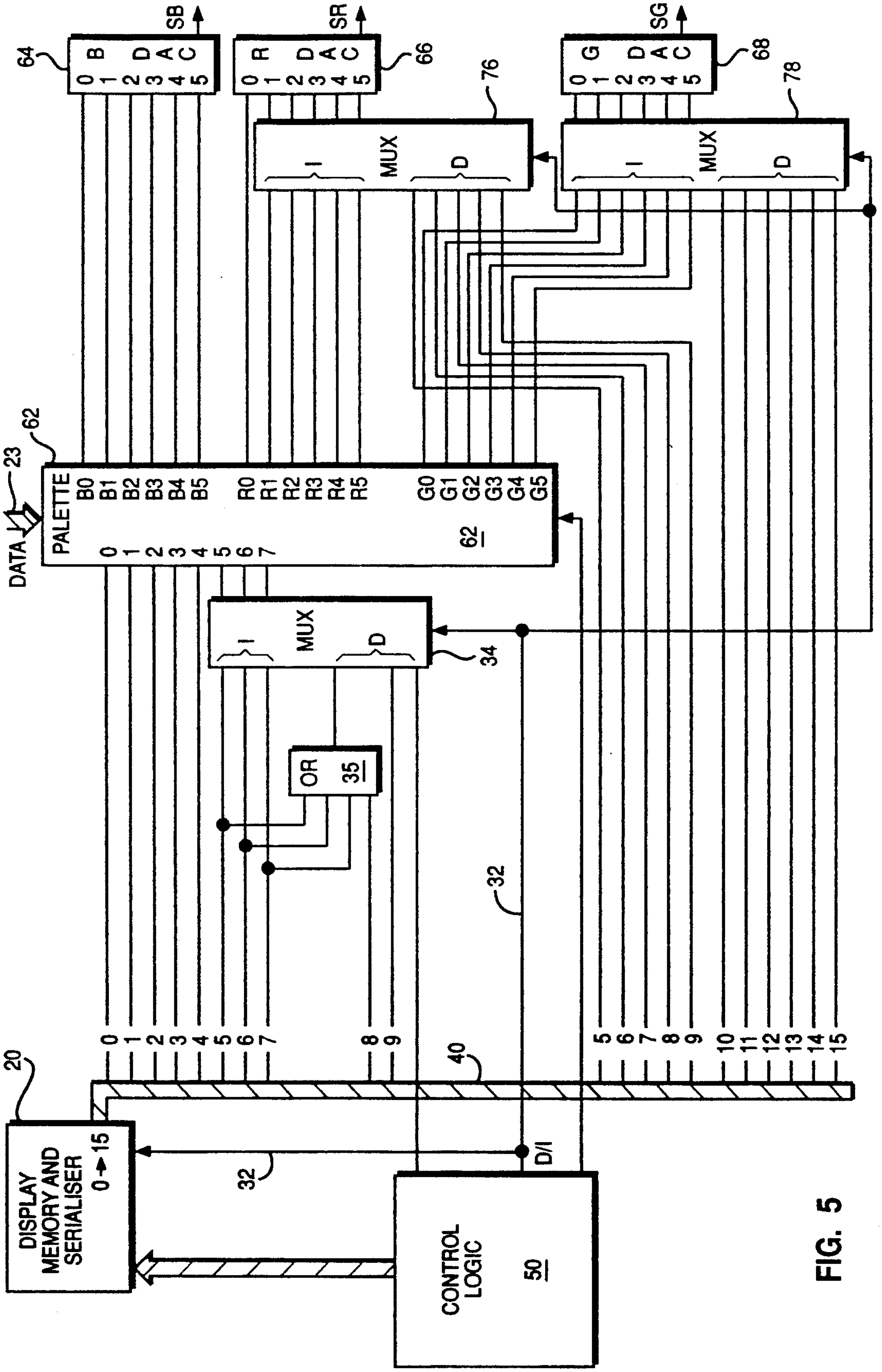
FIG. 5 is a block diagram of elements of a second example of a display system in accordance with the invention.

FIG. 5 is a schematic block diagram of part of a second example of a display system in accordance with the invention based on three six bit, rather than three eight bit DACs. The operation and structure of the display system of FIG. 5 is generally similar to that of FIG. 1. However, there are differences due to the reduced number of bits which are needed to drive the DACs. Once again, for reasons of clarity and ease of explanation, only those features of the display system which are specific to an understanding of how to implement the present invention are illustrated.

Display memory 20 is an all-points addressable display memory with a serialiser such that a plurality of bits per pixel may be stored therein. Palette 22 has eight address inputs (0–7) giving 256 addressable locations. Each addressable location contains eighteen bits of color information. The three six bit DACs 24, 26, 28, each receive six bits of digital input information on inputs 0 to 5 and produce respective analogue output signals SB. SR. SG for controlling the display device. Control logic 30 controls the operation in either an indirect color mode or a direct color mode.

Data is read out from the display memory 20 via a 16-bit data bus 40. In an indirect color mode only eight of the data lines on the bus are used, whereas, in the direct color mode all 16 bits on the data bus 40 are used. Serialiser logic such as that shown in FIG. 2, is included in the display memory 20 for serialising data read out onto the data bus 40.

The operation of the display system of FIG. 5 in an indirect mode will now be explained. To set the display system in an indirect color mode, the control logic outputs an appropriate signal on the line 32 which causes multiplexors 34. 36 and 38 to select inputs to the multiplexors indicated by the letter "I" and causes the sets the serialiser of FIG. 2 such that eight bits of data per pixel are output from the display memory 20 onto lines 0 to 7 of the data bus 40. Bits 0–4 of each group of eight bits are passed directly to the palette, and bits 5–7 of each group are passed via the multiplexor 34 to the palette for indexing specific palette locations. Each palette location indexed in turn yields eighteen bits defining chrominance and/or luminance data for the pixel in question in the form of three six bit intensity values for each of the primary blue, red and green colors. The groups of six bits are channelled via the paths shown in FIG. 1, either straight to the corresponding in the case of palette output bits BO–B5 and RO or via the multiplexors 36 and 38 in the case of palette output bits R1-R5 and GO-G5 respectively.

The operation of the display system of FIG. 5 in a direct mode will now be discussed. To set the display system in a direct color mode, the control logic outputs an appropriate signal on the line 32 which causes multiplexors 34. 36 and 38 to select inputs to the multiplexors indicated by the letter "D" and causes the sets the serialiser of FIG. 2 such that sixteen bits of data per pixel are output from the display memory 20 onto lines 0 to 15 of the data bus 40. In a direct mode, the sixteen bits of data per pixel in the display memory define directly the chrominance and/or luminance values for the pixel and are intended, in principle, to be supplied directly to the DACs. Although the DACs require only 18 bits to drive them. compared to 24 in the example of FIG. 1. sixteen bits are still insufficient to define the state of all the inputs to the three six-bit DACs 24, 26. 28.

Table 3 illustrates an allocation, for a direct color mode, of the green, red and blue bits in a 16 bit word for each of the same two formats discussed with regard to FIG. 1. Table 3 is to be found at the end of this description and relates to the example of a display system in accordance with the invention illustrated in FIG. 5. The two formats relate to the significance of the bits within the 16 bits word. Each 16 bit data word specifies the color and/or chrominance of a pixel and is supplied from the display memory organized either in a 6-6-4 format (6 green bits - 6 red bits - 6 blue bits) or a 6-5-5 format (6 green bits - 5 red bits - 5 blue bits). As with the Table 1 allocation for the FIG. 1 example, only bits 4 through 0 of the 16 bit word change their significance between the two formats for the Table 3 allocation. Thus, in order that the palette is to be used to determine the mode of operation, bits 4 through 0 of the 16 bit word are passed to inputs 4-0, respectively, of the D input port to the multiplexer 34. In the direct color mode, these inputs are passed to the correspondingly numbered outputs of the multiplexer and thence to the correspondingly numbered inputs to the palette for forming part of the address thereto.

In the embodiment of the invention illustrated in FIG. 5, for the allocation of Table 3, the expansion to 6 blue bits for controlling the DACs from the 5 or 4 blue bits of the data word, for 6-5-5 format and 6-6-4 format, respectively, is performed in accordance with the data stored in the palette. This is because all the blue bits in the 16 bit word address the pallette. Although bits 5-2 to the blue DAC could be obtained directly from bits of the 16 bit word, a multiplexer is saved by using the output of the palette for all the blue DAC bits.

In the case of the expansion of the red data for the 6-5-5 format, in addition to the one blue bit (BO) which needs to be generated, an extra red bit (RO) needs to be generated. There are three plausible ways in which this may need to be done, which are similar to those discussed above with regard to FIG. 1. These are:

1. The extra bit is always a constant.
2. The extra bit is tied to the higher-order bit.
3. The extra bit is turned on when any of the other bits is on.

In order for the choice to be made between these three ways, the high-order red bit (R5) and the OR of the remaining red (R4–R1) bits from the 16 bit data word form part of the palette address. In this case therefore. a total of 7 bits are needed to address the palette. This means that half of the palette locations are needed to support the direct color mode. The remaining half of the locations is available for other uses such as, for example, defining the color of the border around the display area on the display screen. In this case the high order palette address bit could be the inverse of the high order bit of the border color index.

In the direct color mode, therefore, the three 6-bit DACs 24. 26 and 28 are driven as follows. Bits 15 through 10 of the direct color data are passed via multiplexer 38 to drive bits 5 through 0 of the green DAC 28. Bits 9 through 5 of the direct color data are passed via the multiplexer 36 to drive bits 5 through 1 of the red DAC 26: the red DAC bit 0 being obtained from the same output (RO) of the palette as is used for indirect data. All 6 bits (5–0) of the blue DAC are driven from the same outputs (B5–BO) of the palette as are used for indirect data. All these connections are shown in FIG. 1.

To operate in 6-4-4 format the palette is loaded with data in a conventional manner via the data bus 23 so that red bit 0 from output RO of the palette is equal to its address bit 4, so that direct data bit 9 is effectively passed to the bit 0 input of the red DAC 26 is unchanged. The blue section of the palette is loaded so as to give any desired translation from 4 to 6 bits.

In 6-5-5 format the palette still receives all the blue direct color bits, so any translation from 5 to 6 bits may be performed. The palette also receives enough information about the red direct color bits for it to perform any reasonable expansion from 5 to 6 bits.

It can be seen therefore that direct color data in either 6-5-5 or 6-6-4 format can be accepted and the data expanded appropriately by the use of the palette. The equations listed below define how to generate the data to be loaded into the palette in order to provide the appropriate expansions for the two data formats (664 and 655) for six bit DACs. For each of the data formats, three approximation methods for the missing bits (constant, gamma correction and even spread) are illustrated.

The palette data bits are numbered 5:0 0 being the low-order bit, all 6 blue bits are relevant. Only bit 0 of the red data is relevant, and none of the green bits are relevant.

In many cases the data to be loaded at a particular location depends on the address of the location. The needed address bits are numbered 6:0, 0 being the low-order bit. In the constant approximations. 'cb'b and 'r'b denote the desired constant values for the missing blue and red bits respectively.

Data format 664

Constant approximation

Blue(5 2)=Address(3:0)
Blue(1:0)='cb'b
Red(0)=Address(4)

Gamma correction approximation

Blue(5:2)=Address(3:0)
Blue(1)=OR of Address(3.2.1.0)
Blue(0)=OR of Address(3.2.1.0)
Red(0)=Address(4)

Even spread approximation

Blue(5:2)=Address(3:0)
Blue(1)=Address(3)
Blue(0)=Address(2)
Red(0)=Address(4)

Data format 655

Constant approximation

Blue(5:1)=Address(4:0)
Blue(0)='b'b
Red(0)='r'b

Gamma correction approximation

Blue(5:1)=Address(4:0)
Blue(0)=OR of Address(4.3.2.1.0)
Red(0)=OR of Address(6.5)

Even spread approximation

Blue(5:1)=Address(4:0)
Blue(0)=Address(4)
Red(0)=Address(6)

As discussed for the example of FIG. 1, many more than the bits 4-0 of the data word would have variable significance of the color data were stored in the display memory 20 in the order RGB rather than the order GRB shown in Table 3. However, as with the FIG. 1 example, if the colors are to be allocated in the order RGB then a mode control bit can be used to indicate whether the data is in 5-6-5 or 6-6-4 format. Circuitry similar to that shown in FIG. 3 and responsive to this mode control bit could be used to reformat the data word output from the serialiser of FIG. 2 into the order shown in Table 3.

Once again this approach could be used to further reduce the number of bits which change their significance between formats for a display system having three six bit DACs, although not with the specific embodiment of FIG. 5. which is designed to operate in accordance with Table 3. A circuit comparable to that shown in FIG. 4 could be used to reorder the data such that only one bit changes its significance between the 5-6-5 and 6-6-4 formats. Table 4 illustrates a data format suitable for use with three six bit DACs in which only one bit changes it significance. Table 4 is to be found at the end of this description.

FIG. 6 illustrates a workstation into which the elements described with respect to the earlier FIGS. may be incorporated. The workstation comprising a central processing unit 80 in the form of a conventional microprocessor and a number of other units including a display adapter 90 connected thereto via a system bus 92. Connected to the system bus are a random access memory RAM 82 and a read only store 81. An I/0 adapter 83 is provided for connecting the system bus to the peripheral devices 84 such as disk units. Similarly, a communications adapter 85 is provided for connecting the workstation to external processors (eg. a host computer). A keyboard 87 is connected to the system bus via a keyboard adapter 86. The display adapter 90 is used for controlling the display of data on a display device 94. In operation the CPU will issue commands to the display adapter over the system bus for causing it to perform display processing tasks.

The elements described with respect to the earlier FIGS. 1 or 5 fit into the display adapter 90 of FIG. 1. In addition to the elements shown, the display adapter will contain other elements, such as storage logic for controlling the storage in the display memory 20 of data received from the bus 92. The storage logic can be conventional, and is not relevant to an understanding of the present invention. Accordingly it is not described herein. The circuitry shown in FIGS. 1 or 5 produces the green, red and blue color signals SB. SR and SG for controlling a display device, here a color CRT.

Although particular examples of the present invention are described herein, the invention as claimed is not limited to these specific examples.

For example, although the specific examples described are designed for use with a cathode ray tube type display device requiring blue red and green color information, it will be appreciated that for other types of devices another combination of colors might be generated. For example if the display device were an ink jet printer signals for each of blue, red and yellow colors might be generated.

Also, in the specific embodiments data is read out from the display memory 20 via a 16-bit data bus 40. In an indirect color mode only eight of the data lines on the bus are used, whereas in the direct color mode all 16 bits on the data bus 40 are used. However, other implementations are possible, for example two buses an eight bit bus for indirect mode data and a sixteen bit bus for direct mode data.

color mode to data bits from said pallette such that both said first and second set of inputs of said converter stage concurrently control said converter stage and determine the analogue values for the display device.

2. The display system of claim 1 wherein, in said direct color mode, a second portion of said data representing said pixel is supplied as an input to address said palette for determining data bits output therefrom to said second set of inputs of said converter stage.

3. The display system of claim 2 wherein said converter comprises a plurality of digital-to-analogue converters and, in said direct color mode, all bits input to one of said converters is supplied from said palette.

4. The display system of claim 3 wherein said converter stage comprises at least three n bit digital-to-analogue converters, one for each primary color of the display device.

5. The display system of claim 4 wherein n is six.

TABLE 1

| Bit number | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 6-5-5 allocation | G7 | G6 | G5 | G4 | G3 | G2 | R7 | R6 | R5 | R4 | R3 | B7 | B6 | B5 | B4 | B3 |
| 6-6-4 allocation | G7 | G6 | G5 | G4 | G3 | G2 | R7 | R6 | R5 | R4 | R3 | R2 | B7 | B6 | B5 | B4 |

TABLE 2

| Bit number | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 6-5-5 allocation | R7 | R6 | R5 | R4 | R3 | G7 | G6 | G5 | G4 | G3 | G2 | B7 | B6 | B5 | B4 | B3 |
| 6-6-4 allocation | R7 | R6 | R5 | R4 | R3 | G7 | G6 | G5 | G4 | G3 | G2 | B7 | B6 | B5 | B4 | R2 |

TABLE 3

| Bit number | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 6-5-5 allocation | G5 | G4 | G3 | G2 | G1 | G0 | R5 | R4 | R3 | R2 | R1 | B5 | B4 | B3 | B2 | B1 |
| 6-6-4 allocation | G5 | G4 | G3 | G2 | G1 | G0 | R5 | R6 | R3 | R2 | R1 | R0 | B5 | B4 | B3 | B2 |

TABLE 4

| Bit number | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 6-5-5 allocation | R5 | R4 | R3 | R2 | R1 | G5 | G4 | G3 | G2 | G1 | G0 | B5 | B4 | B3 | B2 | B1 |
| 6-6-4 allocation | R5 | R4 | R3 | R2 | R1 | G5 | G4 | G3 | G2 | G1 | G0 | B5 | B4 | B3 | B2 | R0 |

We claim:

1. A display system operable in both indirect and direct color modes, said display system comprising:

a display memory;

a palette; and a digital-to-analogue converter stage;

said display system being operable such that:

in an indirect color mode, data in said display memory representing a pixel addresses display data from said palette for conversion in said converter stage into analogue values for controlling a display device; and in a direct color mode, a first portion of said data representing said pixel in said display memory is directly applied to a first set of inputs of said converter stage, and a second set of inputs of said converter stage being responsive in said direct

6. The display system of claim 2 wherein said converter stage comprises three eight bit digital-to-analogue converters, one for each primary color of the display device.

7. The display system of claim 2 wherein, in said direct color mode, said display memory contains m bits of display data per pixel.

8. The display of claim 7 wherein m is sixteen.

9. The display system of claim 2 wherein said display data further comprises chrominance data.

10. The display system of claim 2 wherein said display data further comprises luminance data.

11. The display system of claim 2 wherein said display data further comprises chrominance and luminance data.

* * * * *